(12) United States Patent
Chapman (10) Patent No.: US 8,077,212 B2
(45) Date of Patent: Dec. 13, 2011

(54) SHOCK AND VIBRATION ISOLATOR FOR A CAMERA

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 12/423,712

(22) Filed: Apr. 14, 2009

(65) Prior Publication Data

US 2009/0231451 A1 Sep. 17, 2009

Related U.S. Application Data

(63) Continuation of application No. 10/826,819, filed on Apr. 16, 2004, now Pat. No. 7,522,213.

(51) Int. Cl.
*H04N 5/228* (2006.01)
*H04N 7/18* (2006.01)
*H04N 5/225* (2006.01)
*H04N 5/222* (2006.01)
*F16M 13/00* (2006.01)
*F16M 1/00* (2006.01)
*G03B 39/00* (2006.01)
*G03B 17/00* (2006.01)
*B66C 23/00* (2006.01)

(52) U.S. Cl. ............... 348/208.7; 348/61; 348/208.99; 348/373; 348/722; 248/562; 248/638; 396/12; 396/13; 396/419; 396/421; 212/347

(58) Field of Classification Search ............... 348/61, 348/208.99, 208.7, 373–376, 722; 248/176.1–178.1, 248/187.1, 274.1, 562, 588, 638; 396/428, 419–421, 12–13; 352/242; 212/347–350
See application file for complete search history.

(56) References Cited

U.S. PATENT DOCUMENTS

| | | | | |
|---|---|---|---|---|
| 4,158,490 A | * | 6/1979 | Gottschalk et al. | 352/243 |
| 4,221,353 A | * | 9/1980 | Kuhn et al. | 248/292.11 |
| 4,465,277 A | * | 8/1984 | Dittrich | 473/447 |
| 4,621,786 A | * | 11/1986 | Greenlee | 396/13 |
| 4,989,823 A | * | 2/1991 | Chapman | 248/638 |
| 5,876,008 A | * | 3/1999 | Sweere et al. | 248/325 |
| 5,940,645 A | * | 8/1999 | Bonin | 396/428 |
| 6,752,541 B1 | * | 6/2004 | Dykyj | 396/428 |
| 6,857,254 B2 | * | 2/2005 | Melone et al. | 56/15.8 |
| 7,090,416 B2 | * | 8/2006 | Mootz et al. | 396/421 |
| 2002/0031348 A1 | * | 3/2002 | Chapman | 396/428 |
| 2002/0090215 A1 | * | 7/2002 | Paddock et al. | 396/421 |

FOREIGN PATENT DOCUMENTS

FR 2380492 A * 10/1978
* cited by examiner

*Primary Examiner* — Timothy J Henn
*Assistant Examiner* — Michael Osinski
(74) *Attorney, Agent, or Firm* — Kenneth H. Ohriner; Perkins Coie LLP (57) ABSTRACT

A shock and vibration isolator for a movie or video camera has a vertical axis system including a base, an arm pivotably attached to the base, and at least one spring connected to the base and to the arm. One or more dampeners are connected to the base and to the arm. A horizontal axis system is supported by the vertical axis system. A leveling linkage connects the vertical and horizontal axis systems. The leveling linkage has adjustment features that allow for compensation of camera lens angulation caused by movement of the camera supported on a vehicle rolling over rough or uneven ground.

15 Claims, 10 Drawing Sheets

SHOCK AND VIBRATION ISOLATOR FOR A CAMERA

This application is a Continuation of U.S. patent application Ser. No. 10/826,819, filed Apr. 16, 2004, now U.S. Pat. No. 7,522,213, and incorporated herein by reference.

BACKGROUND OF INVENTION

During filming sequences with a motion picture or video camera, it is often necessary for the camera to be moved over a floor or ground surface. This movement must be accomplished smoothly. Even small amounts of shock or vibration transmitted to the camera lens can result in shaky or erratic recorded images.

One technique for achieving smooth camera movement is to support the camera on a camera cart, dolly or crane which moves or rolls over rails or track. However, installing track is very time consuming. Placement of the track may also interfere with camera angles, since in most filming sequences, it is important that the track must remain out of the field of view of the camera. In addition, after the track is laid, the dolly is necessarily restricted to movement purely along the track. Even small changes to the path of movement of the camera (as may be spontaneously requested by the director, cinematographer, camera operator, etc.) cannot be achieved without changing the track layout. As a result, track is generally only used when absolutely necessary, such as where smooth movement over a very irregular surface (such as sand, gravel, unpaved outdoor surfaces, etc.) is needed.

Due to the need for an extremely stable camera platform, even relatively smoother surfaces, such as paved surfaces, or indoor flooring, can create difficulties in achieving satisfactory filming. The motion picture or video camera is typically mounted on a camera crane or dolly having wheels which roll over the floor or supporting surface. Irregularities in the floor or supporting surface (for example, cracks, bumps, depressions, debris particles, etc.) generate shock and/or vibration impulses which can be transmitted through the structure of the dolly to the camera lens. These impulses degrade steady filming ability. In addition, since the camera is typically positioned substantially above the floor surface, the effects of a small crack or bump in the floor surface can be magnified at the camera position. To reduce the effects of irregularities in the floor surface, camera dollys and cranes having soft tires have been used. However, soft tires cannot eliminate the effects of larger irregularities in the floor surface. In addition, soft tires increase rolling friction, and make the dolly more difficult to move or steer.

The shock and vibration isolator described in Chapman, U.S. Pat. No. 4,989,823, incorporated herein by reference, has successfully been used for several years. This isolator design is very effective in isolating the camera from lateral (side to side) and longitudinal (front to back) shock and vibration impulses. It has been widely used with very good results on camera dollys. However, this isolator design has only limited ability to prevent vertical shock or vibration impulses from reaching the camera.

Accordingly, there is a need for an improved device and system to allow for smooth filming sequences.

Many camera cranes and dollies have a leveling system for keeping the camera platform in a level orientation as the crane or dolly arm pivots up or down. Typically, these leveling systems use a parallelogram linkage, with examples described in Chapman U.S. Pat. Nos. 4,360,187; 5,816,552; 6,345,919 and 6,450,706, incorporated herein by reference. These parallelogram leveling systems keep the camera platform locally level, that is level or parallel with the vehicle, such as a crane or dolly that they are mounted on (and not necessarily level with the ground). However, when the dolly rolls over an irregularity, such as a bump or crack, the dolly is momentarily inclined at a slight angle. This movement, or elevation angulation, causes the camera lens to also be momentarily inclined at a slight angle. This disturbance of the camera lens can become unacceptable, especially when filming distant subjects with telephoto lenses. Accordingly, there is a need for an improved camera platform leveling system able to better compensate for angulation.

SUMMARY OF THE INVENTION

The invention provides a shock and vibration isolating system which effectively reduces physical disturbances to the camera, as the crane, dolly, or other vehicle supporting the camera rolls over an irregular floor or supporting surface. Vibration or shock impulses in each of the vertical, lateral, or longitudinal directions are effectively prevented from significantly disturbing the camera. The present isolator is especially useful on camera cranes where greater ranges of movement, higher rolling speeds, and irregular floor or ground surfaces, such as pavement (having cracks, bumps, expansion joints, etc.) are frequently encountered.

In a first aspect, a camera support has a isolator plate attached to a base and pivotable in a vertical direction. One or more springs aligned at a slight angle to the plate exert a spring force between the base and the plate. The spring force is advantageously adjustable. A dampener element, such as an adjustable viscous shock absorber, exerts a dampening force on the plate. Up and down pivoting movement of the plate effectively prevents shock impulses from disturbing the camera. The camera and the plate remaining largely stationary, due to inertia, while the vehicle carrying the camera support moves up and down over bumps, cracks, or other irregularities in the floor or ground surface.

In a second aspect, a second plate is supported by the first plate and is movable in a lateral direction, and in a longitudinal direction. Springs and optional dampeners advantageously help to prevent lateral and longitudinal impulses from disturbing or reaching a camera attached to the second plate. A leveling system is preferably associated with the first and second plates, to maintain the second plate in a level orientation, as the first plate pivots vertically up and down.

In a third aspect, a camera support or isolator includes a vertical axis system which includes an arm pivotably attached to a base and one or more springs and dampeners connected to the base and arm. A horizontal isolator, such as the lateral/longitudinal isolator described in U.S. Pat. No. 4,989,823, is supported on the arm, with a leveling linkage connected to the base and the horizontal isolator.

In a fourth and separate aspect, a leveling linkage is adjustable to compensate for angulation caused when the crane or dolly supporting the camera rolls over an irregularity on the ground or floor. Accordingly, with the camera support mounted on a crane or dolly, the elevation angle of the camera lens is better maintained, as the crane or dolly rolls over irregularities in the floor surface. The adjustment feature allows the leveling system to be substantially matched with the wheel base of the camera dolly or crane, to reduce agulation affects.

Other objects, features, and advantages will appear below. The invention resides as well in subcombinations and subsystems of the features, elements, and method steps described. The vertical axis isolator can be used alone, or in combination with the horizontal axis isolator system.

It is an object of the invention to provide improved camera supports and isolators.

BRIEF DESCRIPTION OF THE DRAWINGS

In the drawings, wherein the same reference number indicates the same element in each of the views.

DETAILED DESCRIPTION OF THE DRAWINGS

Figure 1:
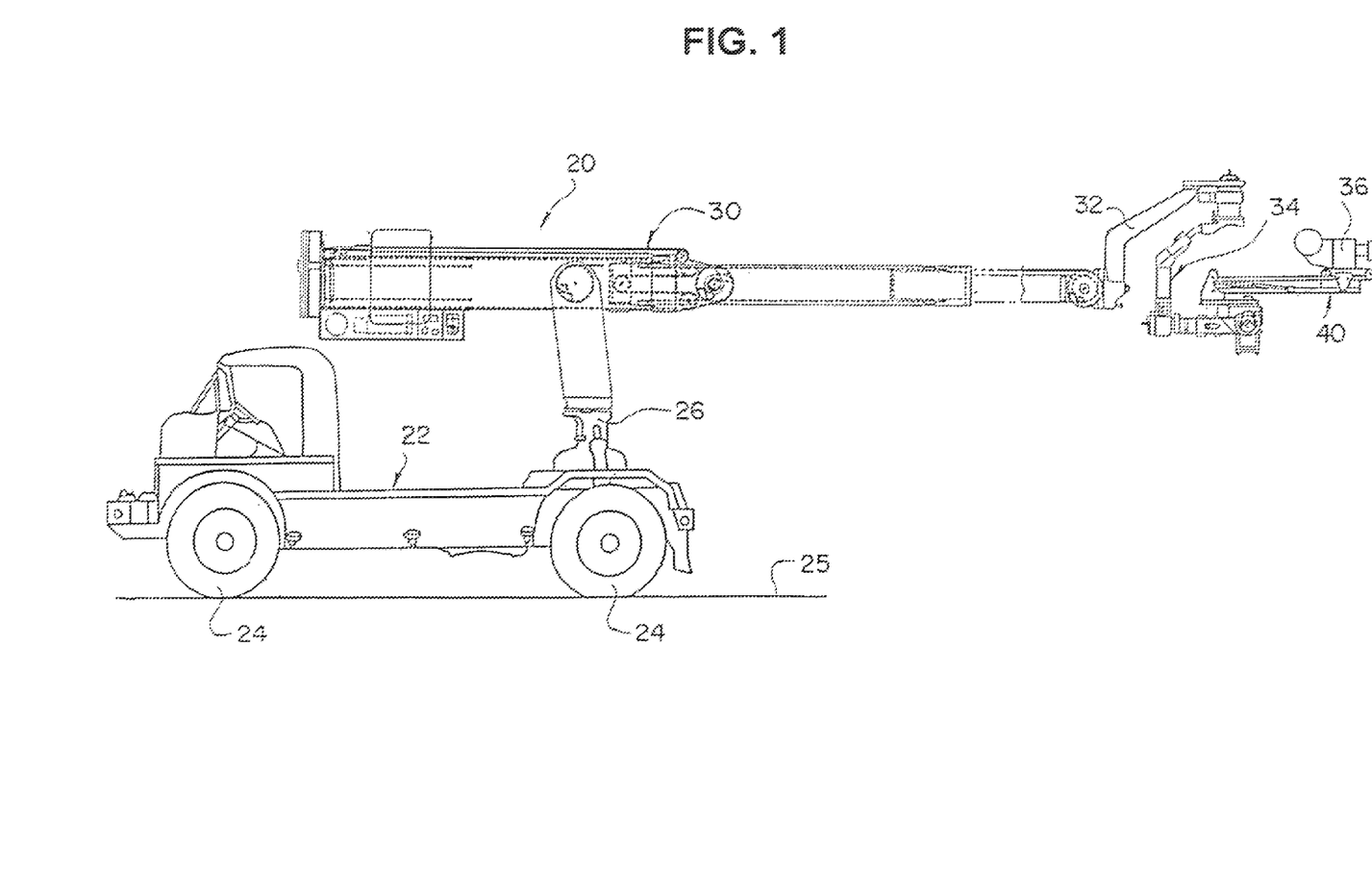
FIG. 1 is a side view of the present camera support or isolator used on a camera crane.
Figure 2:
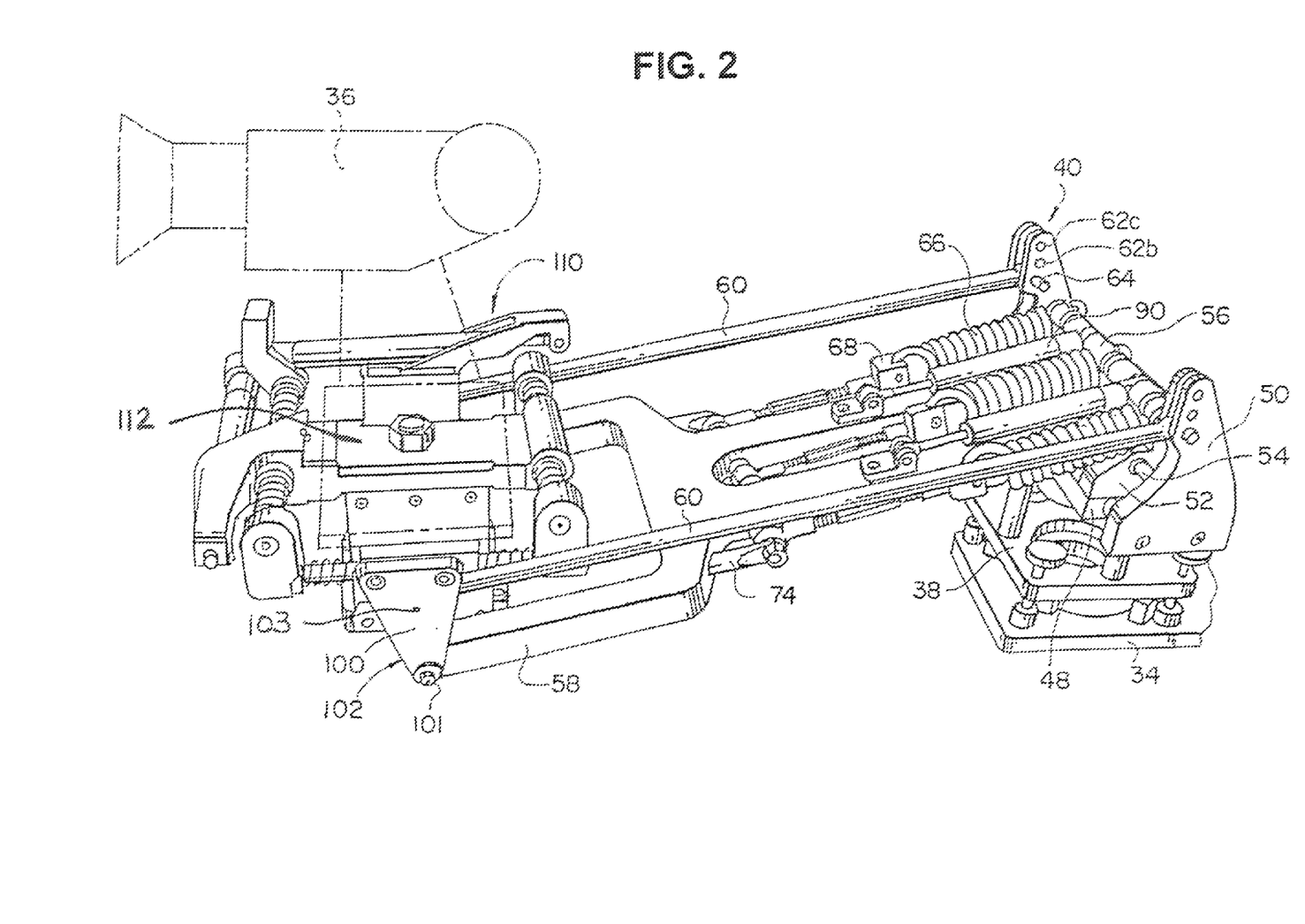
FIG. 2 is a top and left side perspective view of the camera support shown in FIG. 1, with the camera shown in dotted lines, and with one of the lateral dampeners, and one of the longitudinal dampeners removed, for purpose of illustration.
Figure 3:
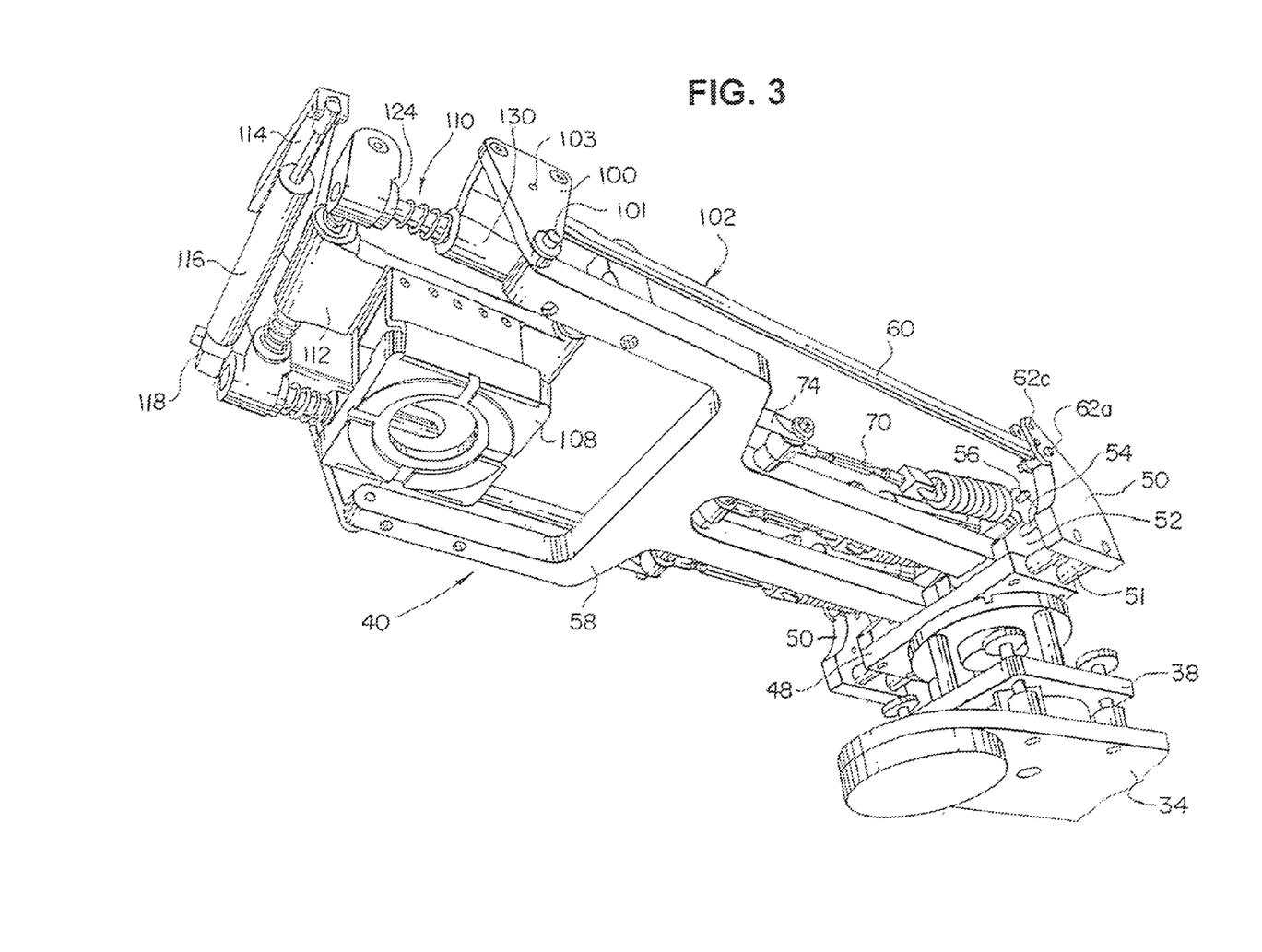
FIG. 3 is a bottom, front, and left side view of the camera support shown in FIG. 2, and with one of the lateral dampeners, and one of the longitudinal dampeners removed, for purpose of illustration.

As shown in FIG. 1, a camera crane 20 has an arm 30 mounted on a mobile vehicle or platform 22 which rolls on wheels 24. The arm 30 is pivotably mounted on a post 26, to allow the arm 30 to move in a panning (azimuth) direction. For typical filming sequences, a nose 32 and a remote movement head 34 may be provided on the arm 30. Referring to FIGS. 1-3, the present shock and vibration isolator or support 40, in the example shown, is supported on an optional leveling head 38 attached to the remote movement head 34. The camera 36 is attached to the front end of the isolator 40, as shown in FIGS. 1 and 2. The arm 30, shown in FIG. 1, may be a fixed length arm (assembled from separate segments) or it may be a telescoping arm, for example, as described in U.S. patent application Ser. No. 10/791,118, incorporated herein by reference. The remote head 34, if used, may be a two or three axis head, as described, for example, in U.S. patent application Ser. No. 10/782,034, incorporated herein by reference. Of course, FIG. 1 shows but a single example of use of the isolator 40 on a crane. The isolator 40 may also be used on camera dollys or other mobile platforms or vehicles with, or without, use of a post 26, arm 30, nose 32, or remote head 34. As shown in FIG. 3, a drop down attachment may be attached to the bottom surface of the mounting plate 112, to mount the camera in an underhand position below the isolator plate 58.

Figure 4:
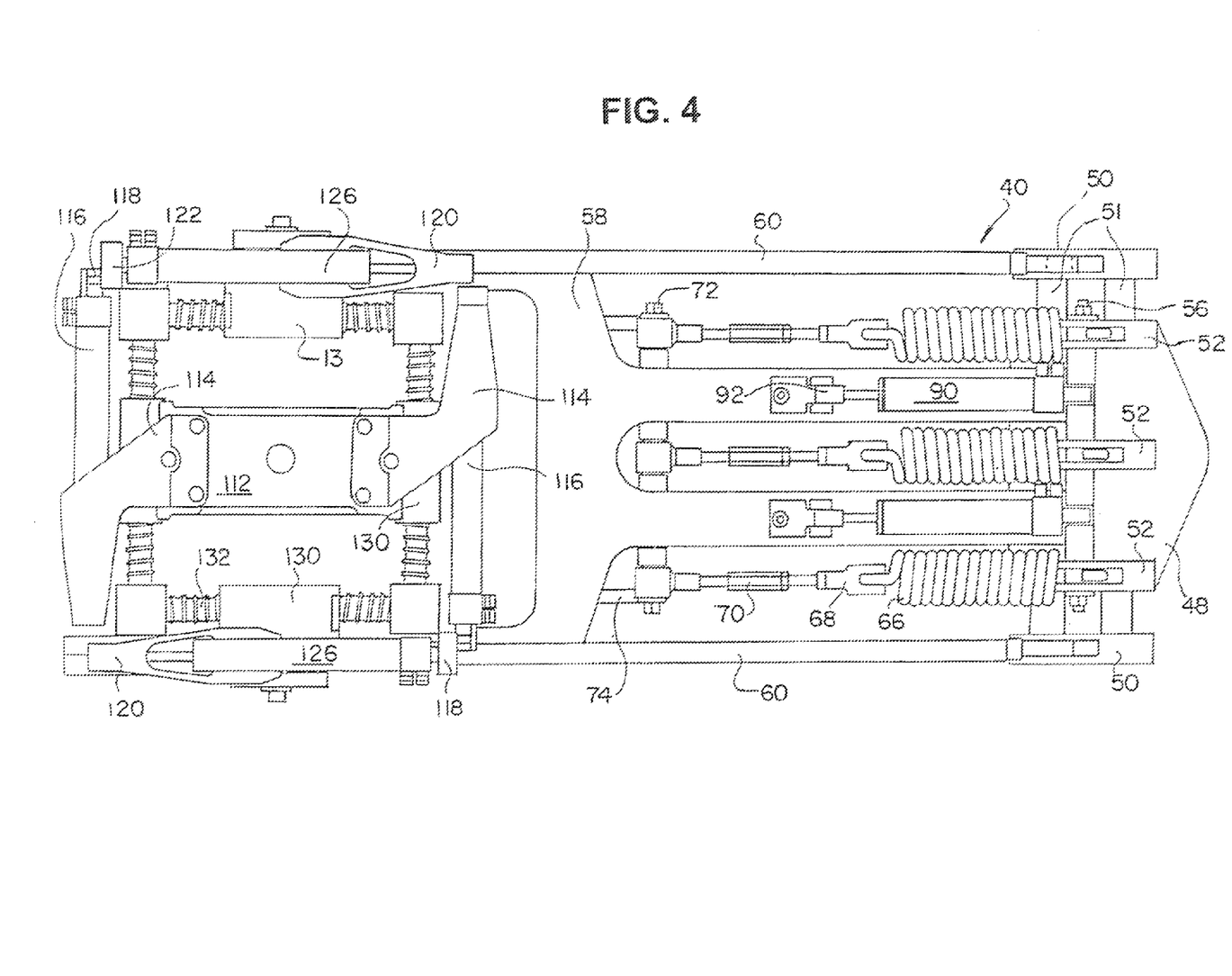
FIG. 4 is a plan view of the camera support shown in FIGS. 2 and 3.

Turning now to FIGS. 2, 3, and 4, the isolator 40 has left and right, or first and second side plates 50 attached to a base 48 by side plate posts 51. The base 48 collectively includes the components of the isolator 40 which are rigidly attached to and move with the crane or dolly arm, or other supporting structure. First and second, or left and right axle plates 52 are attached to the base 48, between the side plates 50. An isolator arm 58 is pivotably attached to plate 48 via an axle 54 extending through the axle plates 52 and holes in the back end of the isolator arm 58. The isolator arm 58 can therefore pivot vertically, or up and down, about the axle 54. A spring bar 56 extends through and is supported by the axle plates 52.

Referring to FIGS. 2 and 3, first and second, or left and right leveling plates 100 are pivotably attached to the front end of the isolator arm 58. A leveling rod 60 is pivotably attached to each leveling plate 100, at the front end of the isolator 40, and is also pivotably attached to a side plate 50, at the back end of the isolator 40. As best shown in FIG. 2, three (or more) holes or openings 62a, 62b and 62c are provided at the top of each side plate 50. The back end of the leveling rod 60 is attached to the side plate 50 at one of the holes 62a-c, using a quick release pin 64. The holes 62a, 62b, and 62c are located on a diameter centered at the pivot joint 103 where the front end of the levelling rods pivotably attach to the levelling plates. These holes are at a position slightly forward of the axle 54. The leveling rods 60 attach to the upper pivot joint 103 on the leveling plates at a location also slightly forward of the lower pivot joint 101 where the isolator plate is attached to the leveling plates 100.

Figure 9:
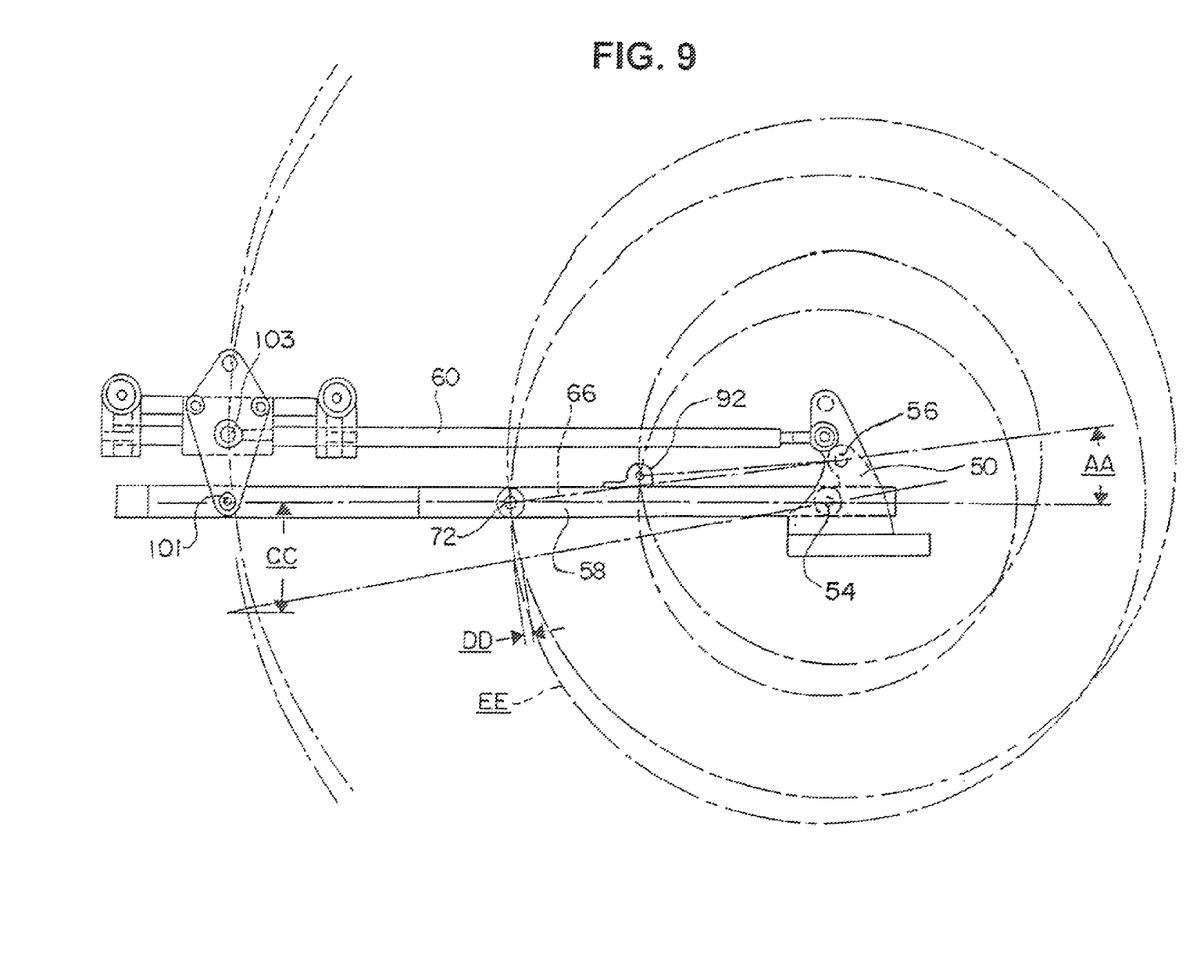
FIG. 9 is a schematic diagram showing operation of the isolator shown in FIGS. 2-8.

As shown in FIGS. 2 and 4, springs 66 are provided to exert a tension spring force on the isolator arm 58. Each spring 66 extends from the spring bar 56, which is rigidly connected to the base or base plate 48, to a turnbuckle 70 attached to a spring axle 72 on the isolator arm 58. A spring cap 68 is used to connect the front end of the spring 66 to the back end of the turnbuckle 70, as shown in FIGS. 2 and 4. Referring momentarily to FIG. 9, the spring bar 56 is vertically above the plate axle 54 and the spring axle 72, as shown in FIG. 4. Accordingly, the tension force exerted by the springs 66 acts at an angle AA to the plane of the isolator arm 58. The angle M preferably ranges from 2-20, 5-15, or 8-12 degrees. This allows for relatively large amounts of pivoting movement of the isolator arm 58, with relatively little deflection of the springs 66, resulting in an elastic or soft feel or movement of the isolator arm 58.

On the other hand, since the angle AA is small, the vertical component of force exerted by the springs 66 is also small. In the design shown, three springs are used to achieve sufficient vertical force on the isolator arm 58. As one example, to support a camera payload of about 100 pounds, three springs 66 are used, with each spring having a spring constant of about 600 pounds/inch. The number and type of spring or springs selected will vary with the intended payload and other parameters.

Figures 7, 8:
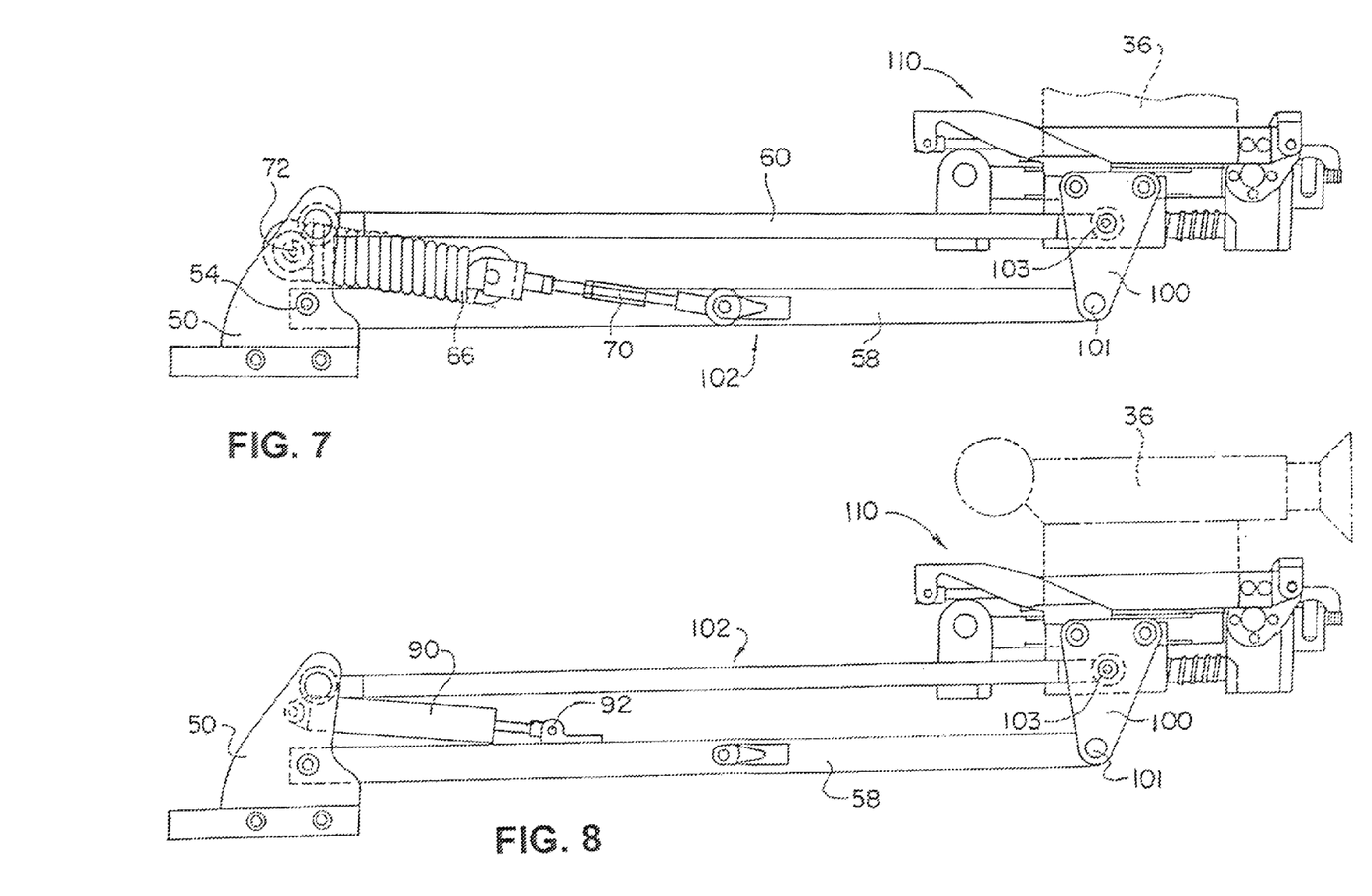
FIG. 7 is a side view of the isolator, as shown in FIG. 5, with the isolator now in a level position after tensioning of the springs.
FIG. 8 is a side view of the isolator, as shown in FIG. 7, with the spring and turnbuckle removed for purpose of illustration.

Spring axle end supports 74 may be provided, as shown in FIGS. 3 and 4, to better support the spring axles 74. Referring still to FIGS. 2 and 4, the back end, or cylinder of a dampening element is attached to the spring bar 54. The piston or front end of the dampening element 90 is attached to a clevis 92. shown in FIG. 8, on the isolator arm 58. Referring to FIGS. 8 and 9, the dampener 90 exerts a dampening force on the isolator arm 58, along an axis or line slightly offset from the spring force direction. The dampeners 90 are preferable viscous or fluid dampeners, with adjustable dampening characteristics. While two dampeners 90 are shown, one or more may be used, and different types of dampening elements may be used. In an alternative design, compression springs can optionally be used instead of, or in addition to, the tension springs 66, with the compression springs attached to a spring bar mounted below the axle 52.

Referring to FIGS. 2-4, a horizontal or X-Y isolator subassembly or subsystem 110 is supported at the front end of the isolator arm 58. The horizontal isolator assembly 110 is similar to the isolator described in U.S. Pat. No. 4,989,823, incorporated herein by reference. However, the horizontal isolator assembly 110 further includes dampening elements. Referring to FIG. 4, lateral shock or dampening arms 114 are attached to the mounting plate 112. A lateral shock absorber or dampener 116 is connected between each arm 114 and a fixed connection point 118, located at diagonally opposite corners of the assembly 110. Referring still to FIG. 4, a ferrule or guide bar housing 130 is attached to each leveling plate 100. The ferrule 130 is slidably positioned around the longitudinal guide bars 132. Longitudinal dampener or shock absorber arms 120 are attached to the left and right side ferrules 130 or leveling plate 100, and to fixed connection points 122, located at diagonally opposite corners of the assembly 110. End cushions 124 are also provided adjacent to the ends of the longitudinal guide bars 132 and to the lateral guide bars 134. Centering compression springs 136 act to maintain the mounting plate 112 in a central position as described in U.S. Pat. No. 4,989,823.

Figure 5:
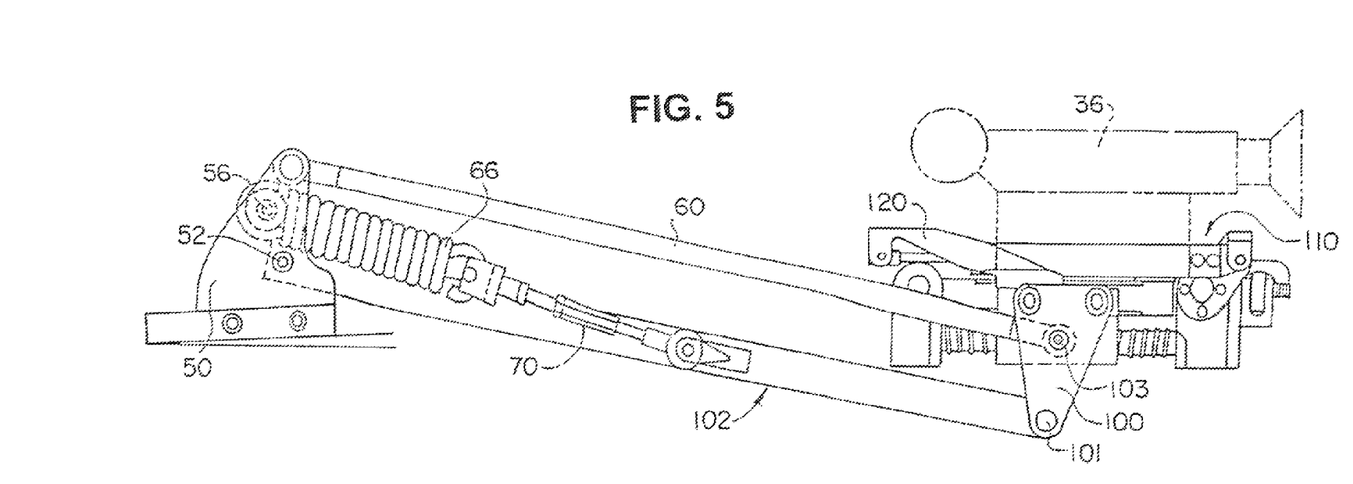
FIG. 5 is a side view of the camera support shown in FIGS. 2-4, with the camera support shown in a downward orientation, before tensioning of the springs.
Figure 6:
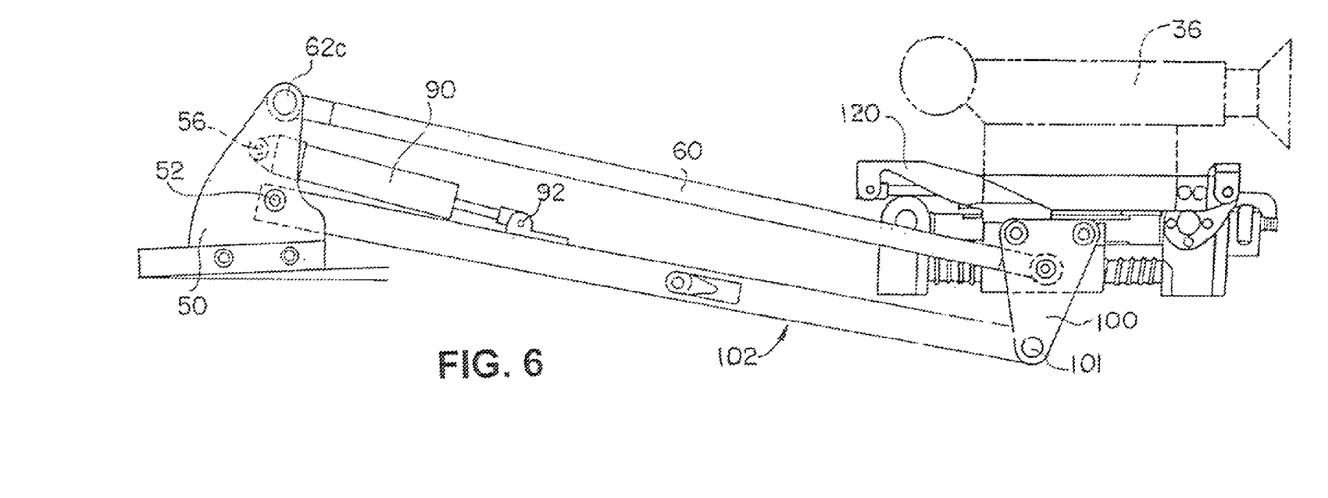
FIG. 6 is a side view of the camera support shown in FIG. 5, with the spring and turnbuckle removed, to illustrate the dampener.

Referring to FIGS. 7-9, a parallelogram linkage 102 is formed by the leveling rod 60, isolator arm 58, leveling plate 100, and the base (which here includes the side plates 50, axle plates 52, axle 54, and the quick release pins 64). As shown by comparing the isolator 40 as shown in FIGS. 5 and 6, with the isolator 40 as shown in FIGS. 7 and 8, as the parallelogram linkage 102 pivots up or down about the base, the leveling plates 100 remain at the same level orientation. Since the ferrules 130 on the leveling plates 100 support the horizontal isolator assembly 110, the horizontal isolator assembly 110 also remains level as the isolator 40 pivots up or down.

In use, the isolator 40 is attached to a remote head 34, or to another crane or dolly accessory, such as a leveling head 38, riser, drop down, swing head, etc. Alternatively, the isolator 40 can be attached directly to a crane or dolly arm, such as the crane arm 30 shown in FIG. 1, or the dolly arm 152 on the dolly 150, shown in FIG. 10. The weight of the camera 36 can vary widely. For example, a compact digital camera and camera accessories may weigh as little as e.g., 20 or 30 pounds while a conventional motion picture film camera, along with its lens and film magazine, batteries, etc. may weigh e.g., 130 pounds. The isolator is therefore advantageously made so that it can be adjusted depending upon the weight of the camera 36.

Referring to FIGS. 5 and 6, while the springs 66 typically have an initial tension (e.g., 150-550, 250-450, or 300-400 pounds), when the camera 36 is initially placed on the mounting plate 112 of the isolator 40, the isolator deflects downwardly, as shown in FIGS. 5 and 6. The turnbuckles 70 are then tightened. This stretches the spring 66 attached to the turnbuckle 70, increasing the spring force, including the vertical component of the spring force, acting on the isolator arm 58. As the turnbuckles 70 are tightened, the isolator arm 58 pivots upwardly from the downwardly inclined position shown in FIGS. 5 and 6, to the level or horizontal position shown in FIGS. 7 and 8. The turnbuckles 70 may be turned using a wrench. Alternatively, they may be provided with hand levers, or similar devices, which allow tightening, or loosening, by hand, so that no tools are required during set up.

Figure 10:
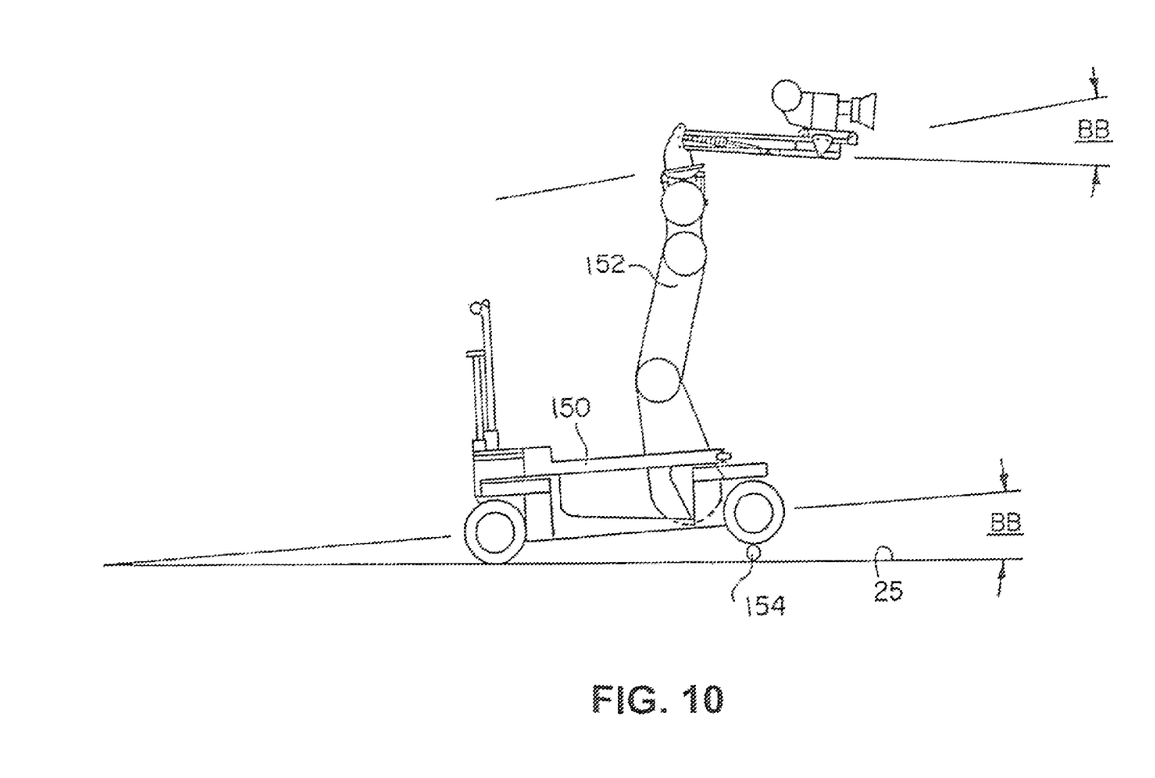
FIG. 10 is a schematic diagram showing reduction of angulation.

The dampeners 90 are adjusted to provide a desired dampening characteristic for movement of the isolator arm 58. As the crane 22, shown in FIG. 1, or the dolly 150, as shown in FIG. 10, rolls over the ground or floor 25, the crane vehicle 22 and arm 30 (or the dolly 150 and dolly arm 152) necessarily move up and/or down vertically, as the wheels roll over irregularities or uneven ground. While the shock and vibration impulses created by rolling over irregularities move through the supporting structure (22 and 30, or 150 and 152) to the base 48, the mounting plate 112 and camera 36 remain largely steady and unaffected. Due to inertia, the camera 36 remains substantially in a fixed position, with the isolator arm 58 pivoting up and down, as driven by the supporting structure 30 or 152.

As the spring force is primarily horizontal, and with only a small vertical component, the isolator arm 58 can achieve a range of travel of about plus or minus 4-10, 5-9, or 6-8 inches (for a total vertical range of travel of 12-16 inches), yet while stretching the springs 66 by only a small amount. For example, as shown in FIG. 9, with the isolator arm 58 moving down vertically by about 4.7 inches (as measured by the pin or bolt 101 attaching the leveling plate 100 to the front end of the isolator arm 58), the springs 66 stretch by a distance DD of about 0.3 inches. As the isolator arm 58 moves down, the spring axles 72 move along diameter EE centered at the axle 54. As the springs 66 are attached to the spring bar 56, offset vertically above, and slightly behind the axle 54, downward movement of the isolator arm 58 causes the springs 66 to stretch. Conversely, upward movement of the isolator arm 58 allows the springs to contract.

Figure 11:
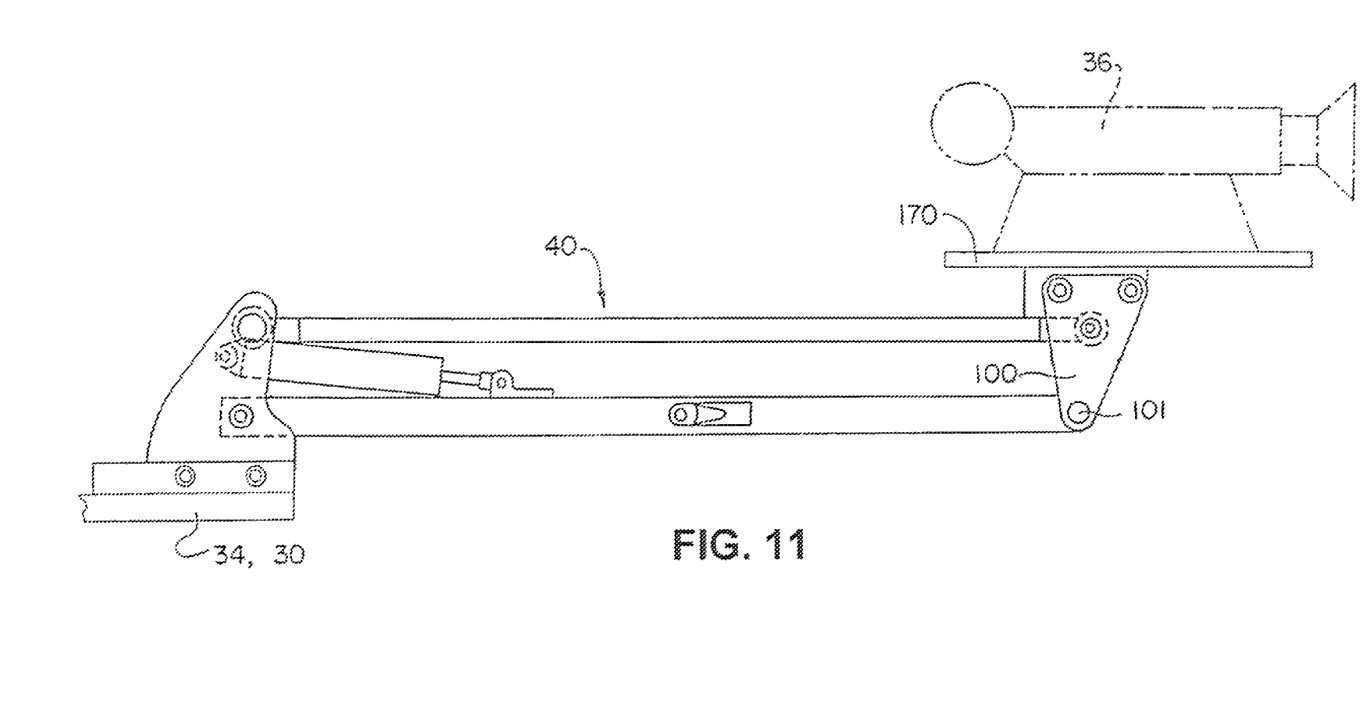
FIG. 11 is side view of the isolator shown in FIGS. 2-8 in use without the horizontal isolator assembly.

As shown in FIG. 11, the isolator 40 may be used without the horizontal isolator assembly. In this use, a camera mounting plate 170 is directly and rigidly attached to the leveling plates 100, and the camera is mounted on the mounting plate 170. This provides for vertical isolation of the camera.

The horizontal isolator assembly 110, if used, isolates the camera 36 mounted on the mounting plate 112 from longitudinal and lateral shock and vibration impulses, similar to as described in U.S. Pat. No. 4,989,823. In addition, the dampening elements 116 and 126 dampen lateral and longitudinal movement. The dampening elements are arranged in pairs, with each pair acting together, to avoid torquing the mounting plate 112, as the springs act to return the mounting plate to the center position, after a deflection caused by a shock impulse from the base.

As described in U.S. Pat. No. 4,989,823, the lateral guidebars 134 have a radius of curvature. As described therein, for use with larger dollys or cranes, the radius of curvature of the lateral guidebars 134 is larger. Accordingly, for use on a small camera dolly, as shown in FIG. 10, the radius of curvature of the lateral guidebars 134 may be e.g., 36-144 inches. For use on a larger vehicle, such as the crane shown in FIG. 1 where the camera 36 is ordinarily at a higher elevation above the ground, the radius of curvature of the lateral guidebars 132 will be greater (meaning that the bars will have less curvature), for example, in the range of 60-168 inches.

Referring to FIGS. 2 and 10, the adjustment positions 62a, 62b and 62c of the leveling rods 60 can be used to change the characteristics of the parallelogram linkage 102, to compensate for elevation angulation. As shown in FIGS. 10, when the front wheel of a mobile vehicle, such as a camera dolly 150 rolls over a bump, crack, cable, or other irregularity 154, the front end of the dolly 150 necessarily rises up, as the wheel rolls over the irregularity. Consequently, the entire dolly 150, arm 152, and base 48 of the isolator 40 are also moved into an incline position, at an angle BB in FIG. 10. The angle BB in FIG. 10 is exaggerated for purpose of illustration. In actual use, the inclination angle BB would be much smaller and less noticeable.

Since the parallelogram linkage 102 ordinarily maintains the mounting plate 112 level with the base 48, the mounting plate and camera 38 are ordinarily inclined upwardly at angle BB, due to the angulation caused by the irregularity 154 on the floor 25. As a result, the elevation angle of the camera lens is higher than intended, and higher than when the dolly 50 is level. While the angulation may be acceptable in some filming sequences, in others, especially where telephoto lenses are used to film subjects at a great distance, this angulation may be disadvantageous or unacceptable. The alternate connection locations 62a, 62b, and 62c for the leveling rods 60 allow the isolator 40 to compensate for elevation angulation. As shown in FIGS. 5 and 6, with the leveling rods 60 connected to the side plates 50 at the top location 62a, the leveling rod 60 is no longer precisely parallel to the isolator plate 58. Consequently, as the now slightly non-parallel linkage 102 pivots down and up, the camera mounting plate will pivot clockwise and counterclockwise, respectively, by a proportional amount. With this setup, the camera mounting plate is level with the base only when the linkage 102 is horizontal. When the dolly 150 rolls over an irregularity creating elevation angulation, the downward pivoting movement of the isolator arm 58 results in the parallelogram linkage 102 pivoting the mounting plate 112 and the camera 36 slightly downwardly, or clockwise in FIGS. 5 and 6. The lens of the camera 36 accordingly remains generally aimed at the subject. Without the compensation provided by the angulation adjusting features 62c, the lens would be aimed to high.

After the dolly 150 rolls over the irregularity and returns to a level position, the base also returns to a level position, as shown in FIGS. 7 and 8, along with the isolator arm 58. The linkage 102 similarly returns to its centered or neutral position, wherein the mounting plate 112 and camera 36 are level. The reverse angulation compensating effect occurs when the front wheels of the dolly 150 roll into a recess or depression, or the rear wheels encounter a bump, and the isolator arm 58 moves into an upwardly angled position. With the isolator arm 58 angled upwardly, the linkage 102, when set up as shown in FIGS. 5 and 6, tilts the mounting plate 112 and the camera 36 slightly upwardly, or counter-clockwise in FIGS. 5 and 6, to better maintain aim of the lens. As is apparent from FIG. 10, the shorter the wheel base of the crane or dolly, the more elevation angle will occur as the dolly rolls over an irregularity. The angulation compensation feature of the linkage 102 is therefore especially useful with small camera dollys.

While the parallelogram adjustment or compensation features are shown as the holes 62a, 62b, and 62c having different vertical positions on the side plates 50, the same compensating effect can be achieved by similar holes on the leveling plates 100, or by changing the pivot joint locations of the isolator plate 58 to create a non-parallel or near-parallel linkage. In the specific design shown, where the spacing between the axle 54 and the leveling plate lower pivot joint 101 is about 26 inches, the holes 62a, 62b and 62c are preferably spaced vertically apart by 0.3-0.7 or 0.8, 0.4-0.6 or about 0.5 inches. Alternatively, the elements forming the longer sides of the near parallelogram, here the leveling rods and the isolator plate 58, are offset so that they form an angle of 2-7, 3-6 or about 4 or 5 degrees with each other.

In general, the selection of the top, center, or lower holes 62a, 62b, or 62c will be determined on whether elevation angulation is desired. If no elevation angulation compensation is wanted, the first or lower hole 62a is used. If elevation angulation compensation is desired, the second or center hole 62b is preferably used when the mobile vehicle has a larger wheel base (typically about 150 or 200 cm or greater). The top hole 62c is preferably used when the vehicle has a shorter wheel base, to provide increased compensation for the increased angulation occurring with vehicles or dollys having a shorter wheel base (typically about 80 to 120 or 150 cm, or less). Of course, additional holes, or overlapping notches, may also be provided, to provide various degrees of angulation compensation. While the use of quick release pins and the holes 62a-c are shown, other equivalent techniques or means for changing the positions of the levelling rods may also be used, including clamping fittings, cams, screw threads, latches, etc. The levelling rods may also include means for varying their length, such as screw threads, turnbuckles, telescoping arrangements, etc., to vary the initial camera position set up, as well as the compensation characteristics of the isolator.

Figure 12:
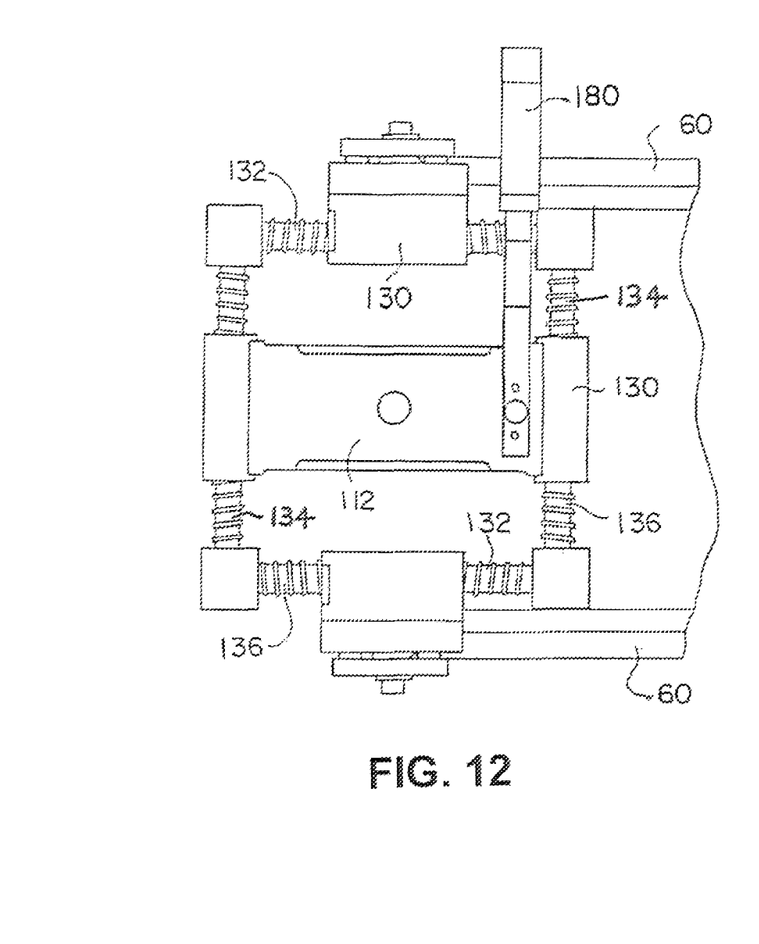
FIG. 12 is a plan view of an alternative horizontal isolator assembly design.
Figure 13:
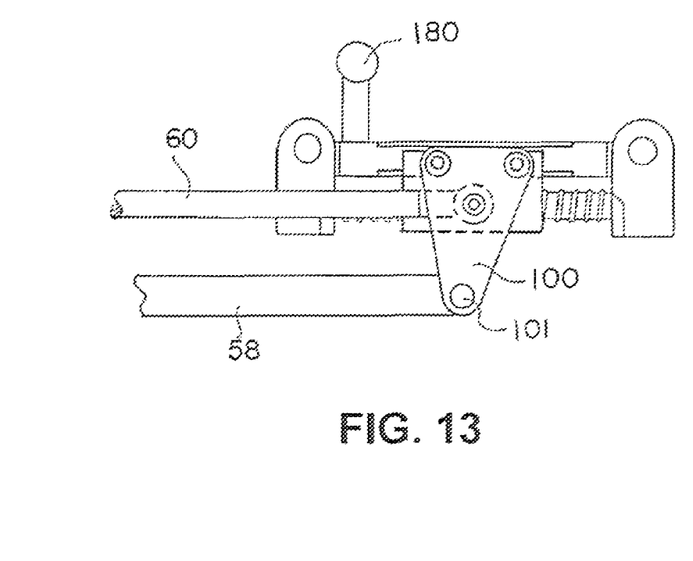
FIG. 13 is side view of the alternative horizontal isolator assembly shown in FIG. 12.

Turning to FIGS. 12 and 13, in an alternate design of the horizontal isolator assembly, the pairs of dampening elements 116 and 126 are removed. No dampening elements are used. A handle 180 attached to the mounting plate 112 extends out to one side. The springs 136 are provided with a spring constant which is just sufficient to overcome friction and to slowly return the mounting plate to the center position. Dampening, if desired, if provided manually, by holding the handle 180, and optionally pushing or pulling the mounting plate back to the center position, after a deflection away from the center position.

As described above, the isolator 40, together with the horizontal isolator assembly 110 can provide five degrees or modes of isolation. The horizontal isolator assembly 110 provides lateral isolation, longitudinal isolation, and vertical isolation via the curvature of the lateral guidebars 134. Additional or large movement vertical isolation is provided via the pivoting movement of the isolator arm 58. Elevation angulation compensation or correction is provided by the adjustable parallelogram linkage 102, as described above.

Thus, a novel and shock and vibration isolator for a camera has been shown and described. Various changes and modifications may of course be made without departing from the spirit and scope of the invention. The invention, therefore, should not be limited, except by the following claims and there equivalents.

The invention claimed is:
1. A shock and vibration isolator for a camera comprising:
first and second spaced apart side plates;
an axle connecting to the side plates;
an isolator arm attached to the axle, with the isolator arm pivotable vertically relative to the side plates;
a bar attached to the side plates;
a plurality of springs connected to the isolator arm and to the bar;
first and second spaced apart leveling plates pivotally attached to the isolator arm;
a first leveling rod having a first end attached to the first side plate at a first side plate pivot joint and having a second end attached to the first leveling plate at a first leveling plate pivot joint; and
a second leveling rod having a first end attached to the second side plate at a second side plate pivot joint and having a second end attached to the second leveling plate at a second leveling plate pivot joint;
with the bar between the first and second side plate pivot joints; and
at least one viscous dampener having a first end connected to the bar and having a second end connected to the isolator arm at a position in between the bar and the second leveling plate pivot joint.

2. The shock and vibration isolator of claim 1 further including a turnbuckle between the isolator arm and each of the springs.

3. The shock and vibration isolator of claim 1 further including one or more alternate attachment positions for the leveling rods on the side plates or the leveling plates.

4. The shock and vibration isolator of claim 1 further including means for adjusting tension in the springs.

5. The shock and vibration isolator of claim 1 further including a horizontal axis isolator supported on the leveling plates.

6. The shock and vibration isolator of claim 5 with the horizontal axis isolator including a first longitudinal bar slidable through a first fitting on the first leveling plate, and a second longitudinal bar slidable through second fitting on the second leveling plate, and a first lateral bar and a second lateral bar extending between and supported by the first and second longitudinal bars, and a mounting plate slidable along the first and second lateral bars.

7. The shock and vibration isolator claim 6 with the first and second lateral bars having a radius of curvature of 60-168 inches.

8. The shock and vibration isolator of claim 6 further comprising lateral springs acting to hold the mounting plate at a lateral central location on the lateral bars, and longitudinal springs acting to hold the mounting plate at a longitudinal central location on the longitudinal bars;
- a pair of lateral dampeners attached to the mounting plate; and
- a pair of longitudinal dampeners attached to the mounting plate.

9. The shock and vibration isolator of claim 1 further including a base with the side plates attached to the base, and adjustment features for adjusting the leveling rod to compensate for angulation movement of the base.

10. The shock and vibration isolator of claim 1 further including a base with the side plates attached to the base with the springs exerting a spring force at an angle of 2-15 degrees to a plane of the base.

11. A shock and vibration isolator for a camera comprising:
- a vertical laxis isolator including:
  - first and second spaced apart side plates
  - an axle connecting to the side plates;
  - an isolator arm attached to the axle, with the isolator arm pivotable vertically relative to the side plates;
  - a bar attached to the side plates;
  - a plurality of isolator arm springs connected to the isolator arm and to the bar;
  - first and second spaced apart leveling plates pivotally attached to the isolator arm;
  - at least one viscous isolator arm dampener connected to the isolator arm and to the bar at a position in between the bar and a second leveling plate pivot joint; and
  - first and second leveling rods, with each leveling rod pivotally attached at one of a plurality of attachment positions on the first and second side plates, respectively; and
- a horizontal axis, isolator supported on the leveling plates, and including:
  - a first longitudinal bar supported by the first leveling plate, and a second longitudinal bar supported by the second leveling plate, and a first lateral bar and a second lateral bar extending between and supported by the first and second longitudinal bars, and a mounting plate on the first and second lateral bars;
  - at least one first longitudinal spring on the first longitudinal bar and at least one second longitudinal spring on the second longitudinal bar with the first and second longitudinal springs biasing the first and second longitudinal bars towards a central position relative to the leveling plates, and at least one first lateral spring on the first lateral bar and at least one second lateral spring on the second lateral bar, with the first and second lateral springs biasing the mounting plate towards a central position between the first and second longitudinal bars, with the springs exerting a spring force in a first direction and the dampener exerting a dampening force in a second direction different from the first direction.

12. The shock and vibration isolator of claim 1 with the at least one spring having a first end connected to the isolator arm at a first location and having a second end connected to the bar, and the at least one viscous dampener having a first end connected to the isolator arm at a second location closer to the bar than the first location, and having a second end connected to the bar.

13. An isolator for a camera, comprising; a base;
- first and second spaced apart side plates attached to the base;
- an axle connecting to the side plates;
- an isolator arm attached to the axle, with the isolator arm pivotable relative to the side plates;
- a spring axle within an opening in the isolator arm;
- a bar attached to the side plates;
- a spring connected to the spring axle and to the bar;
- first and second spaced apart leveling plates pivotally attached to the isolator arm;
- a first leveling rod having a first end attached to the first side plate at a first side plate pivot joint and having a second end attached to the first leveling plate at a first leveling plate pivot joint; and
- a second leveling rod having a first end attached to the second side plate at a second side plate pivot joint and having a second end attached to the second leveling plate at a second leveling plate pivot joint;
- with the bar between the first and second side plate pivot joints; and
- at least one viscous dampener having a first end connected to the bar and having a second end connected to the isolator arm at a position in between the bar and the second leveling plate pivot joint.

14. The isolator of claim 13 further including adjustment features for adjusting the leveling rods to compensate for angulation movement of the base.

15. The isolator of claim 13 with the adjustment features comprising alternative position of the first and second side plate pivot joints on the first and second side plates.

* * * * *